US012642264B1

(12) United States Patent

Putnam

(10) Patent No.: US 12,642,264 B1

(45) Date of Patent: Jun. 2, 2026

(54) INSECT SWATTER HAVING A CATCH BASIN

(71) Applicant: Scott Putnam, Asbury, IA (US)

(72) Inventor: Scott Putnam, Asbury, IA (US)

( * ) Notice: Subject to any disclaimer, the term of this patent is extended or adjusted under 35 U.S.C. 154(b) by 10 days.

(21) Appl. No.: 18/489,522

(22) Filed: Oct. 18, 2023

Related U.S. Application Data

(60) Provisional application No. 63/475,162, filed on Oct. 20, 2022.

(51) Int. Cl.
*A01M 3/02* (2006.01)

(52) U.S. Cl.
CPC ..................................... *A01M 3/02* (2013.01)

(58) Field of Classification Search
CPC ......... A01M 3/02; A01M 3/022; A01M 3/025
See application file for complete search history.

(56) References Cited

U.S. PATENT DOCUMENTS

| | | | |
|---|---|---|---|
| 1,228,701 A | | 6/1917 | Rochfort |
| 2,326,845 A | * | 8/1943 | Etzler ...................... A01M 3/02 |
| | | | 43/136 |
| 2,328,632 A | * | 9/1943 | Etzler ...................... A01M 3/02 |
| | | | 43/136 |
| 2,624,149 A | | 1/1953 | Atkinson |

| | | | |
|---|---|---|---|
| 2,902,793 A | * | 9/1959 | Lossius .................... A01M 3/02 |
| | | | D22/124 |
| 2,911,250 A | * | 11/1959 | Lossius .................... A01M 3/02 |
| | | | D22/124 |
| 4,759,150 A | * | 7/1988 | Pierce .................... A01M 3/022 |
| | | | 43/136 |
| 4,793,094 A | * | 12/1988 | Weaver .................... A01M 3/02 |
| | | | 43/137 |
| 9,661,838 B1 | * | 5/2017 | Ho ......................... A01M 19/00 |
| 11,439,138 B2 | | 9/2022 | Putnam |

FOREIGN PATENT DOCUMENTS

| | | | | |
|---|---|---|---|---|
| CN | 203226182 U | * | 10/2013 | |
| CN | 106172329 A | * | 12/2016 | ............ A01M 3/025 |
| DE | 4038667 A1 | * | 5/1992 | |
| EP | 0461397 A1 | * | 12/1991 | |
| KR | 20110008045 U | * | 8/2011 | |
| WO | WO-2017194846 A2 | * | 11/2017 | |

* cited by examiner

*Primary Examiner* — Magdalena Topolski

(57) ABSTRACT

The invention is an insect swatter designed for efficient and hygienic pest control. This swatter features a flat top side for striking insects and a backside that seamlessly integrates with a basin situated on one side of the swatter's back wall. Perpendicular side walls, parallel to each other, extend from a back wall and connect to a front wall of the basin. The side walls are also perpendicular to the front wall, forming a well-defined space. A bottom wall, perpendicular to the basin's top side and back side walls, along with the unbounded side opposite it within the basin, facilitates insect collection. Furthermore, a flexible handle, made from either flexible material or the same material as the swatter and basin, is connected to the swatter or its integral part.

10 Claims, 5 Drawing Sheets

104

109

106

102

100

104

INSECT SWATTER HAVING A CATCH BASIN

FIELD OF THE INVENTION

The present invention relates generally pertains to the field of insect swatters, designed to effectively eliminate insects and conveniently collect their remains into an integrated basin for subsequent disposal.

BACKGROUND OF THE INVENTION

Existing insect swatters have long served as indispensable tools for households and businesses alike in combatting unwanted insects. These devices typically consist of a handle with a flat, swatting surface, often made of lightweight materials such as plastic or wire mesh. Users wield them to swiftly strike and incapacitate insects in mid-air or upon contact with surfaces. While their basic design remains consistent, some variations incorporate features like electrified grids to enhance effectiveness.

U.S. Pat. No. 1,228,701A—in 1916, Alexander Rochfort devised a design featuring a basin encircling the lower part of a swatter. Notably, both the swatter and the basin are distinct components, constructed from mesh material and joined together by seams running along their sides. This basin comprises front and back sections, which are connected to each other at the base and along their perimeters. The upper part of the basin remains unobstructed, housing the swatter within its confines.

The primary concern with the previously described design lies in its complexity, resulting in a high number of components required for its construction. This complexity can significantly drive up the manufacturing costs of the device. Assembling numerous parts not only increases production expenses but also introduces potential challenges in terms of quality control and reliability. Moreover, the intricate nature of the design may make it more challenging for consumers to use and maintain the swatter, potentially discouraging widespread adoption.

Another critical issue with this design is the practical functionality of the swatter itself. The basin that surrounds the swatter's lower portion, while intended for insect collection, inadvertently hinders the swatter's effectiveness. When users attempt to strike an insect, only a limited portion of the swatter's surface comes into direct contact with the target due to the protruding basin. This restriction can impede the swatter's ability to swiftly and accurately eliminate insects, diminishing its overall efficiency as a pest control tool. Therefore, there is a pressing need for a more streamlined and cost-effective design that allows the swatter to perform its primary function effectively, addressing both cost concerns and practical usability.

U.S. Pat. No. 2,624,149A—In 1949, Wallace Atkinson applied for and was granted a patent for an insect swatter featuring an additional edge designed to facilitate the gathering of deceased insects. With this design, users are required to transport the deceased insects on the upper surface of the swatter until they can dispose of them in a trash receptacle.

Although Wallace Atkinson's innovation marked an improvement in the field of insect swatters, one notable drawback was the inconvenience associated with transporting deceased insects for disposal. The requirement for users to carry the dead insects on the swatter's upper surface until they could reach a suitable disposal location proved to be not only distasteful but also cumbersome. This limitation in the design highlighted a need for a more user-friendly and hygienic solution for dealing with the aftermath of insect swatting, prompting further exploration into innovative designs that offer enhanced convenience and cleanliness.

U.S. Ser. No. 11/439,138B2 describes an insect swatter equipped with dual striking surfaces for targeting insects, creating a pocket or pouch nestled between its front and back sides. This swatter includes a slanted or beveled edge designed to facilitate the retrieval of insects and direct them into a collection basin. Subsequently, the user has the convenience of transporting the captured insects to a designated waste disposal area or unit.

The above described document exhibits a couple of notable drawbacks. Firstly, its swatter section lacks flexibility, which can lead to a reduction in the force and impact delivered when swatting insects. A flexible swatter typically provides a more effective and powerful strike, ensuring a higher chance of successfully incapacitating the target insect. In this case, the limited flexibility might hinder the swatter's overall performance.

Secondly, similar to the design described by Rochfort, this unit's front side and back side are connected at the bottom and along both sides, constraining the size of the pouch or catch basin formed between them. This limitation in space could potentially restrict the user in terms of the number of insects that can be captured before requiring disposal. A larger pouch would allow for more efficient insect collection and reduce the need for frequent trips to a waste disposal area. Therefore, addressing these issues of flexibility and limited pouch size could lead to an improved and more user-friendly insect swatter design.

Existing insect swatter designs exhibit several notable shortcomings that can hinder their effectiveness and user-friendliness. These issues primarily revolve around their construction, practical functionality, and overall convenience.

One common problem with many existing swatters is their complexity and the number of components required for assembly. This complexity can drive up manufacturing costs and make quality control more challenging, potentially leading to durability issues. Assembling numerous parts also complicates the user experience, making it less user-friendly and discouraging widespread adoption.

Another critical concern is the practical functionality of these swatters. In some designs, the swatting surface is not sufficiently flexible, resulting in a reduced impact when striking insects. A flexible swatter typically delivers a more effective and powerful strike, ensuring a higher likelihood of successfully incapacitating the target insect. Therefore, a lack of flexibility can diminish the swatter's overall performance.

Additionally, some swatters feature a design where the front and back sides are connected at the bottom and along the sides, forming a limited pouch or catch basin between them. This constraint in space can restrict the number of insects that can be captured before disposal, necessitating frequent trips to a waste disposal area. A larger pouch would allow for more efficient insect collection and reduce user inconvenience.

Furthermore, the need for users to transport dead insects on the top side of the swatter until they can reach a suitable disposal location is often considered distasteful and cumbersome. This aspect of many swatter designs can be a hygiene concern and may discourage users from effectively using the swatter as a pest control tool.

Addressing these issues and innovating in swatter design is essential to create more cost-effective, user-friendly, and efficient solutions for insect control. A more streamlined, flexible, and hygienic design would enhance the overall experience for users and contribute to more effective pest management.

SUMMARY OF THE INVENTION

To address the foregoing problems, in whole or in part, and/or other problems that may have been observed by persons skilled in the art, the present disclosure provides compositions and methods as described by way of example as set forth below.

A principal object of the invention is to provide improved and efficient insect swatter, designed to effectively eliminate insects and to ensure a more hygienic operation by carrying the dead insects within a basin located opposite the swatter side, not having the insects get caught within that basin, due to the enlarged size of the basin, and the radius on the perpendicular meeting points of the walls of that interior basin, thus enhancing overall cleanliness and user satisfaction.

Another object of the invention is to provide an improved insect swatter that offers improved flexibility in the swatting section to deliver more effective and impactful strikes against insects.

Another object of the invention is to simplify the construction of the swatter to reduce the number of components required, making it more cost-effective to manufacture and maintain.

Another object of the invention is to provide a design that maximizes the space for insect collection between the front and back sides of the swatter to minimize the need for frequent disposal trips.

Another object of the invention is to provide a user-friendly insect swatter that is easy to use, encouraging wider adoption and effective pest control in households and businesses.

In a first implementation of the invention, there is provided an insect swatter which includes a flat top side designed for striking insects. Its backside forms a seamless unity with the swatter, integrating a basin positioned alongside the swatter's rear wall. The side walls, extending either perpendicularly or nearly perpendicularly from the back wall, run in parallel or near parallel, ultimately converging at the front wall of the basin. These side walls exhibit perpendicular or nearly perpendicular orientation concerning the front wall, demarcating the space effectively. Furthermore, a bottom wall runs perpendicularly or nearly perpendicularly, connecting the top side wall of the basin and the back side wall of the basin, while also maintaining perpendicular or near-perpendicular alignment with the side walls of the basin. Notably, one side within the basin remains unbounded. The swatter is equipped with a handle, crafted from either a flexible material or the same flexible material used for the swatter and basin, where such handle is attached to the basin and swatter to make the unit one integral unit, or whereas the handle is molded within the same mold as the basin and swatter, making all three parts a one-piece construction.

In a second aspect of the invention, the insect swatter is made of a resilient material which is a plastic chosen from a group of flexible plastics, like a Polypropylene and Polyethylene, but not limited as such.

In another aspect of the invention, the basin walls at the intersecting points, which are perpendicular to each other, feature rounded edges or a radius at their junctions.

In another aspect of the invention, the basin's side walls are accompanied by additional wall or walls that run parallel to the side walls, making contact with the bottom wall, oriented perpendicularly to that wall, and affixed to and perpendicular to both the back side of the swatter and the top side of the basin.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Figure 1:
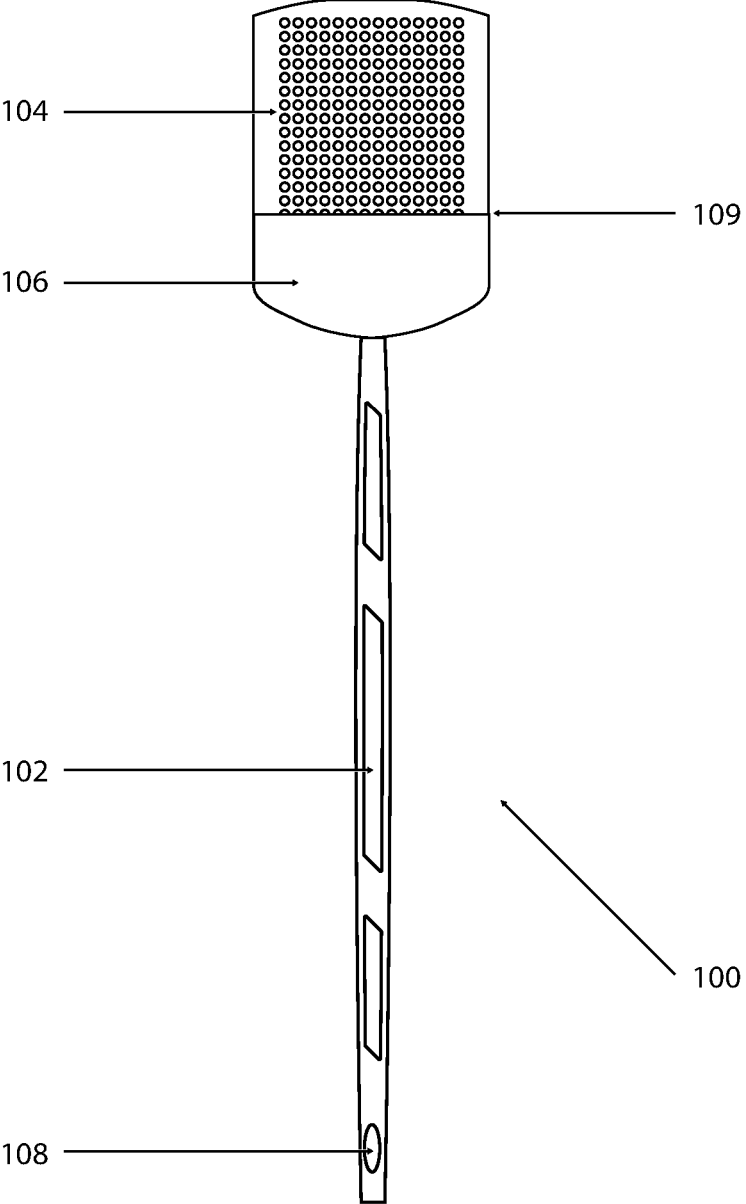
FIG. 1 illustrates a schematic front view of the insect swatter, in accordance with an embodiment of the present invention.

Skilled artisans will appreciate that elements in the drawings are illustrated for simplicity and may not have necessarily been drawn to scale. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having the benefit of the description herein.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The subject matter of the present invention now will be described more fully hereinafter with reference to the accompanying drawings, in which some, but not all embodiments of the subject matter of the present invention are shown. Like numbers refer to like elements throughout. The subject matter of the present invention may be embodied in many different forms and should not be construed as limited to the embodiments set forth herein; rather, these embodiments are provided so that this disclosure will satisfy applicable legal requirements. Indeed, many modifications and other embodiments of the subject matter of the present invention set forth herein will come to mind to one skilled in the art to which the subject matter of the present invention pertains having the benefit of the teachings presented in the foregoing descriptions and the associated drawings. All illustrations of the drawings are for the purpose of describing selected versions of the present invention and are not intended to limit the scope of the present invention. Therefore, it is to be understood that the subject matter of the present invention is not to be limited to the specific embodiments disclosed and that modifications and other embodiments are intended to be included within the scope of the appended claims.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and example of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one", but does not exclude a plurality unless the contextual use dictates otherwise. When used herein to join a list of items, "or" denotes "at least one of the items", but does not exclude a plurality of items of the list. Finally, when used herein to join a list of items, "and" denotes "all of the items of the list".

Shown throughout the figures, the present invention is directed to an insect swatter featuring a flat top side engineered for insect striking purposes. The backside of this swatter seamlessly integrates with the main body, incorporating a basin along one side of the swatter's rear wall. These side walls extend either in a perpendicular or near-perpendicular manner from the rear wall, maintaining parallel or near-parallel alignment, ultimately converging at the front wall of the basin. These side walls demonstrate a perpendicular or nearly perpendicular orientation relative to the front wall, effectively delineating the inner space. Additionally, a bottom wall runs in a perpendicular or near-perpendicular fashion, connecting the top side wall of the basin to the back side wall of the basin, while also maintaining perpendicular or near-perpendicular alignment with the side walls of the basin. Notably, one side within the basin remains unrestricted. The swatter is furnished with a handle, which can be fashioned from either a flexible material or the same flexible material employed in constructing the swatter and basin, and is seamlessly affixed to the swatter or an integral.

The disclosed insect swatter introduces a cost-effective design by integrating the catch basin into a single, unified piece. This approach streamlines manufacturing processes, reducing production costs. The swatter component of the device features a flat, traditional design, while the attached basin is cleverly positioned on the underside of the swatter's back side. This strategic placement ensures that the basin does not compromise the flexibility or impact of the upper portion of the swatter, as it extends notably beyond the basin's area. Essentially, the basin functions as an extension of the swatter's structure, rather than an impediment to its performance. Importantly, the basin covers only a specific portion of the swatter's rear side, leaving the rest of the swatter's body unaltered. This design optimizes the swatter's usability for efficient insect removal while maintaining cost-effectiveness in production.

The unique design of this swatter incorporates an advantageous feature that enhances its effectiveness in insect control. Specifically, the flat side of the swatter, which is intended for striking insects, is deliberately engineered to be more flexible. This flexibility is a key factor in delivering a more powerful and impactful blow to the targeted insects upon contact. When the user swats at an insect, the flexible swatting side can bend and then quickly snap back into shape, creating a forceful impact that is highly effective in incapacitating the insect.

What sets this design apart is that the opposite side of the swatter, which doesn't include the basin or additional components, remains unaltered and free from any structures or embodiments that might hinder its flexibility. As a result, the swatter can maintain its maximum flex capability until it reaches slightly beyond the halfway point of its length. This strategic design choice ensures that the swatter retains its full range of motion during the swatting motion, allowing it to exert a powerful impact on insects while remaining highly efficient and user-friendly in practice.

In an embodiment, the basin of the disclosed insect swatter is a substantial improvement over previous designs, notably larger in size to accommodate a broader range of insects. What sets it apart is the strategic orientation of its components. The basin features a bottom wall that runs perpendicularly or nearly perpendicularly to the side walls. Importantly, this bottom wall extends at least a quarter of an inch (0.25"), providing ample space for larger insects to fall into the basin without obstruction. This design consideration ensures that even sizable insects can be efficiently captured and removed.

Moreover, the side walls of the basin are engineered to surpass the width of the bottom wall, creating a draft that widens the opening at the top of the basin compared to its bottom. This design divergence is a significant departure from prior art, particularly exemplified by designs such as Putnam and Rochfort, where the top and bottom side walls of the basin met at an acute angle. In those designs, insects had the potential to become wedged into the V-shaped crevice formed by the meeting walls, impeding effective insect collection.

The disclosed invention addresses this issue by allowing insects to reach the bottom of the basin without the risk of becoming entrapped. Additionally, a small radius is incorporated at the point where the perpendicular walls meet. This radius serves a dual purpose: it prevents insects from being trapped in sharp corners and reinforces the meeting point of the perpendicular walls. This reinforcement distributes the impact force over a larger arc when the swatter strikes an insect, reducing the risk of material cracking and enhancing the durability of the swatter. Overall, this design not only ensures more effective insect collection but also enhances the longevity of the swatter, making it a valuable and efficient tool for pest control.

In an embodiment, within the basin of this inventive insect swatter, an essential feature is the inclusion of one or more walls positioned between the side walls. These internal walls run either in a parallel or nearly parallel fashion in relation to the side walls, and they establish contact with and reinforce both the top and bottom walls of the swatter. Furthermore, these internal walls run perpendicularly or nearly perpendicularly to the top and bottom walls.

This strategic reinforcement mechanism serves a vital purpose. In the absence of these internal walls, the flexible material used in the construction of the swatter might collapse inward when insects are captured within the basin, potentially entrapping them. However, by incorporating these reinforcing internal walls, the swatter's structural integrity is maintained, preventing any inadvertent collapsing of the basin's walls. This design innovation ensures that insects can be collected and transported without the risk of being trapped or harmed within the basin, contributing to the overall efficiency and user-friendliness of the insect swatter.

In an embodiment, the design of the handle in this insect swatter offers versatility in terms of production methods and assembly. One option is to mold the handle directly onto the swatter and basin during manufacturing. This approach is cost-effective because it streamlines the production process by creating an all-in-one structure without the need for additional assembly steps. The handle becomes an integral part of the swatter and basin, resulting in a single, unified embodiment.

Alternatively, the handle can be added to the embodiment separately during the assembly process. In this approach, the handle is not molded onto the swatter and basin during manufacturing but rather attached to the swatter later on. This option allows for flexibility in design and customization, as handles of different materials or styles can be easily incorporated into the swatter as needed. Ultimately, this design flexibility caters to various production requirements and preferences, offering both cost-effective, integrated solutions and adaptable options for customization, depending on the specific needs of manufacturers and users.

In an embodiment, the design feature that involves beveling the tip of the swatter towards the basin serves a practical purpose, enhancing the overall functionality of the insect swatter. This beveled edge is oriented in such a way that when the user needs to scrape an insect into the basin, the design makes this task notably easier and more efficient.

The beveled tip creates a sloping surface that gently guides the insect towards the basin as the user scrapes it across. This angled edge ensures that there are no sharp corners or obstructions that might hinder the smooth movement of the insect. Instead, the beveled edge provides a seamless transition from the swatter's striking surface to the basin, allowing the insect to effortlessly slide into the collection area.

In essence, this design feature not only streamlines the process of capturing insects but also minimizes the chances of insects getting stuck or caught on the swatter's surface. It enhances the overall user experience by making the insect removal process quicker, more effective, and less likely to cause damage to the swatter or the insects being collected.

In an embodiment, the insect swatter is constructed from a resilient material, specifically selected from a group that includes Polypropylene and Polyethylene, although it is not limited to these materials.

In an embodiment, the basin walls exhibit a thoughtful refinement at their intersecting points, specifically those that are perpendicular to each other. At these critical junctions, the basin walls feature rounded edges or a radius. This design choice not only contributes to the aesthetics but also serves a practical function by preventing sharp corners that could potentially trap insects or compromise the swatter's durability.

Furthermore, the basin's side walls are ingeniously complemented by additional wall or walls that run in parallel to the side walls. These supplementary walls make direct contact with the bottom wall of the basin. They are oriented perpendicularly to this bottom wall and are securely affixed to both the back side of the swatter and the top side of the basin. This arrangement ensures structural integrity and enhances the overall robustness of the swatter's construction.

The dimensions of the bottom wall of the basin and the opening are also noteworthy. They both exceed a substantial ⅛ inch, ensuring that insects, even of larger sizes, can comfortably pass into the basin without obstruction. This feature greatly enhances the swatter's effectiveness in capturing various insects, regardless of their dimensions.

Lastly, the combination of the side walls, the back side wall of the swatter, and the front side wall of the basin results in a distinct shape. This shape is intentionally designed to resemble a rectangle or a substantially rectangular configuration. This geometric choice not only contributes to the swatter's overall aesthetics but also aligns with the functional aspects of the design, further enhancing its efficiency in insect collection.

In accordance with an embodiment of the present invention, FIG. 1 illustrates a schematic front view of the insect swatter 100. This figure shows a handle 102 serves as the central gripping point, allowing users to hold the insect swatter with comfort and precision. This ergonomic handle design ensures a secure grasp, enabling users to effectively target and strike insects. The figure further shows a flat top side 104, which functions as the primary striking surface. Its flat and robust construction is instrumental in delivering a forceful blow to immobilize or eliminate insects upon contact. This critical component ensures the swatter's effectiveness in pest control. Beneath the swatter, there is provided a basin 106 which is positioned on the underside of the swatter, it serves as a receptacle for the captured insects. The basin's design is engineered to securely contain the immobilized insects, making it convenient for users to collect and dispose of them while maintaining a hygienic and efficient pest control process. Further, at the distal end of the handle 102, there is a hole 108. This multifunctional feature serves as a storage point for the insect swatter when not in use, enabling users to hang it conveniently on a hook or place it in a readily accessible location. Additionally, it can also function as an attachment point for a strap or lanyard, simplifying the swatter's carrying and storage options.

Further, as shown in FIG. 1, the relative height of the basin 106 in comparison to the overall size of the swatter labeled as 109. Specifically, the basin's height is deliberately designed to be less than half of the swatter's total height. This design choice is significant because it ensures that the basin does not dominate the swatter's structure but rather functions as a complementary feature. By maintaining the basin at a height less than half of the swatter's size, several advantages are realized. Firstly, it preserves the flexibility and impact potential of the upper portion of the swatter, ensuring that the primary swatting function is not compromised. The swatter retains its effectiveness in striking and immobilizing insects without being encumbered by an excessively large basin. Secondly, this design allows for an efficient balance between the swatter's striking surface and the insect collection area. The basin 106 is adequately sized to capture insects, but it does not overshadow the primary purpose of the swatter, which is to swiftly and effectively eliminate pests.

Figure 2:
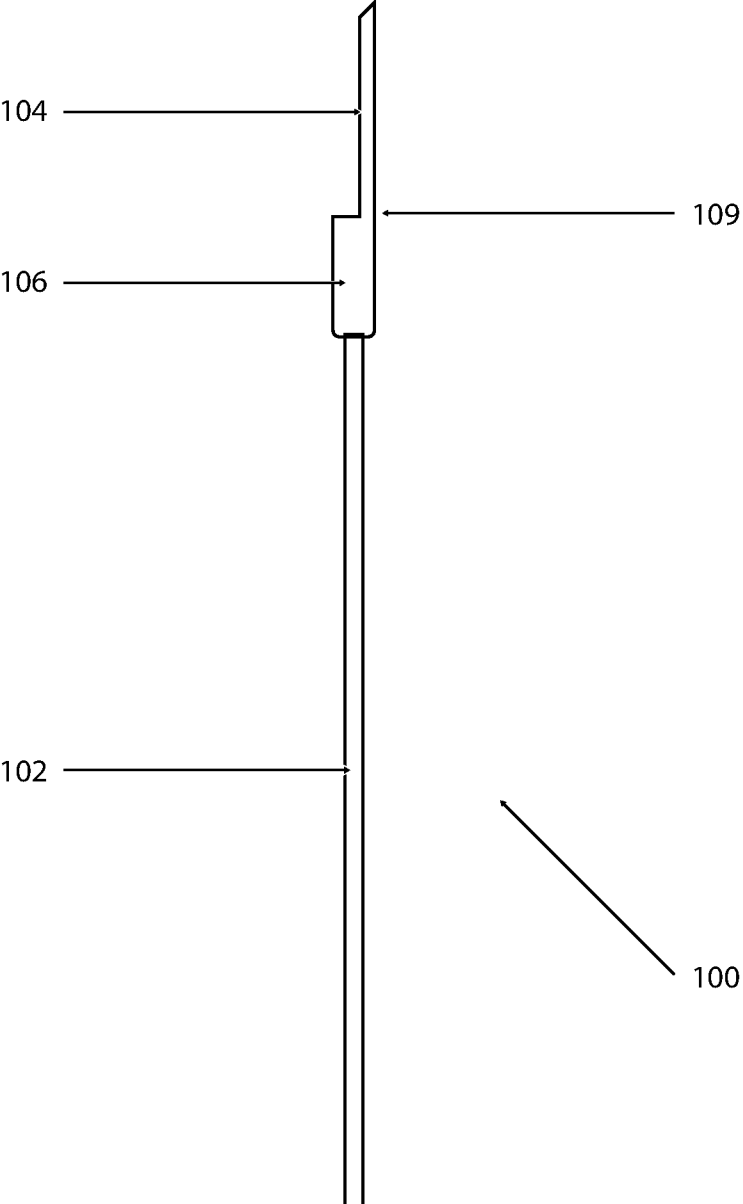
FIG. 2 illustrates a schematic side profile view of the insect swatter, in accordance with an embodiment of the present invention.

In accordance with an embodiment of the present invention, FIG. 2 illustrates a schematic side profile view of the insect swatter 100. This figure shows the side profile of the insect swatter 100 having the handle 102, flat top side 104 for striking the insects, and the basin 106.

Figure 3:
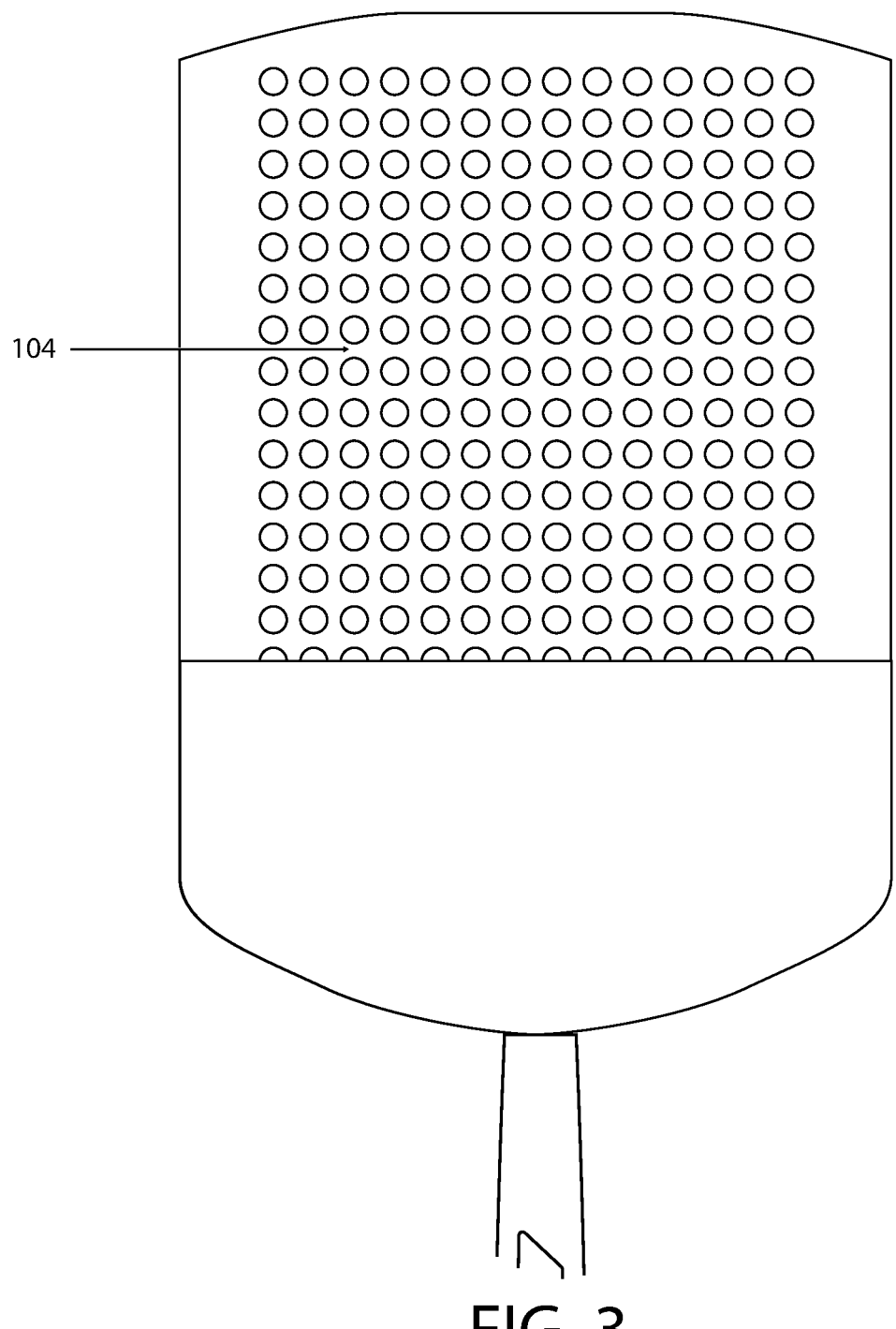
FIG. 3 illustrates a schematic front view of the flat top side of the insect swatter, in accordance with an embodiment of the present invention.

FIG. 3 illustrates a schematic front view of the flat top side 104 of the insect swatter 100, in accordance with an embodiment of the present invention. Crafted to be flat and robust, this surface ensures a powerful and precise impact when striking insects. Its uncluttered appearance is both simple and highly functional, delivering a clean and direct blow to immobilize or eliminate pests efficiently. Its construction features a net-like surface that enhances its functionality and efficacy. With its ergonomic handle and striking surface seamlessly integrated into the swatter's design, it presents a user-friendly and effective solution for pest control, reflecting a commitment to both performance and convenience.

Figure 4:
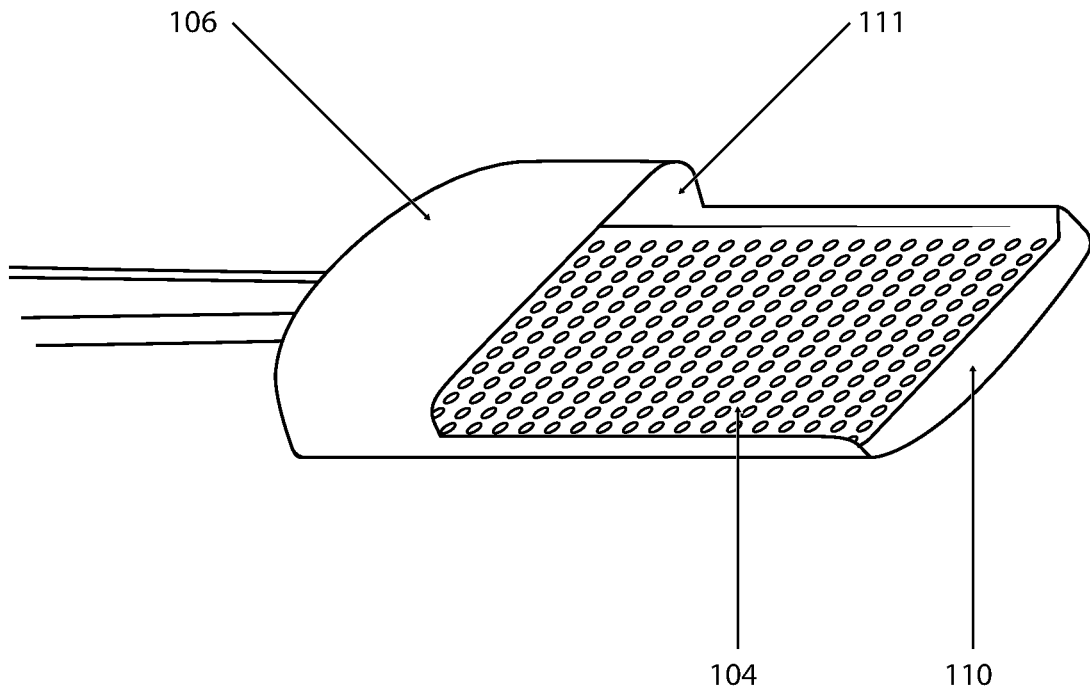
FIG. 4 illustrates a top-angled view of the basin of the insect swatter, in accordance with an embodiment of the present invention.

FIG. 4 illustrates a top-angled view of the basin 106 of the insect swatter 100, in accordance with an embodiment of the present invention. This figure shows the basin 106 of the insect swatter 100 which serves as a critical component in the design, engineered to efficiently collect and contain insects once they have been immobilized by the swatter's striking surface 104. This component is strategically positioned on the underside of the swatter, providing a secure receptacle for captured insects. Notably, the basin 106 is designed to be larger in size, ensuring it can accommodate a wide range of insects, regardless of their dimensions. Moreover, the bottom wall of the basin 106 is carefully constructed to be perpendicular or nearly perpendicular to the side walls, and it extends significantly, exceeding ⅛ inch in dimension. This spacious design not only allows larger insects to easily fall into the basin but also minimizes any potential obstruction during the collection process. The figure further shows that the top side portion of the swatter employed for insect striking has a beveled tip 110, and the flat side of the swatter body is marginally longer than the beveled tip of said swatter on the basin side. As already discussed in the above paragraphs, the beveled tip 110 creates a sloping surface that gently guides the insect towards the basin as the user scrapes it across. This angled edge ensures that there are no sharp corners or obstructions that might hinder the smooth movement of the insect. Instead, the beveled edge provides a seamless transition from the swatter's striking surface to the basin, allowing the insect to effortlessly slide into the collection area.

Further, as shown in FIG. 4, a notable feature is the size of the opening of the basin, which is specifically labeled as 111. This opening is strategically designed to be larger than ⅛ inch in dimension, signifying that it exceeds this minimum threshold. The significance of this design choice is twofold. Firstly, it ensures that the opening of the basin is generously sized, allowing for the unhindered passage of insects into the collection area. This design consideration is crucial for effectively capturing insects of varying sizes, including larger ones, without any obstruction or difficulty. In essence, it enhances the swatter's efficiency in pest control. Secondly, the generous size of the opening 111 also contributes to the overall user-friendliness of the swatter. When users strike insects with the swatter's flat top side and direct them toward the basin, the larger opening minimizes the risk of insects getting stuck or trapped at the entrance. It streamlines the insect collection process, making it cleaner and more hassle-free for users.

Figure 5:
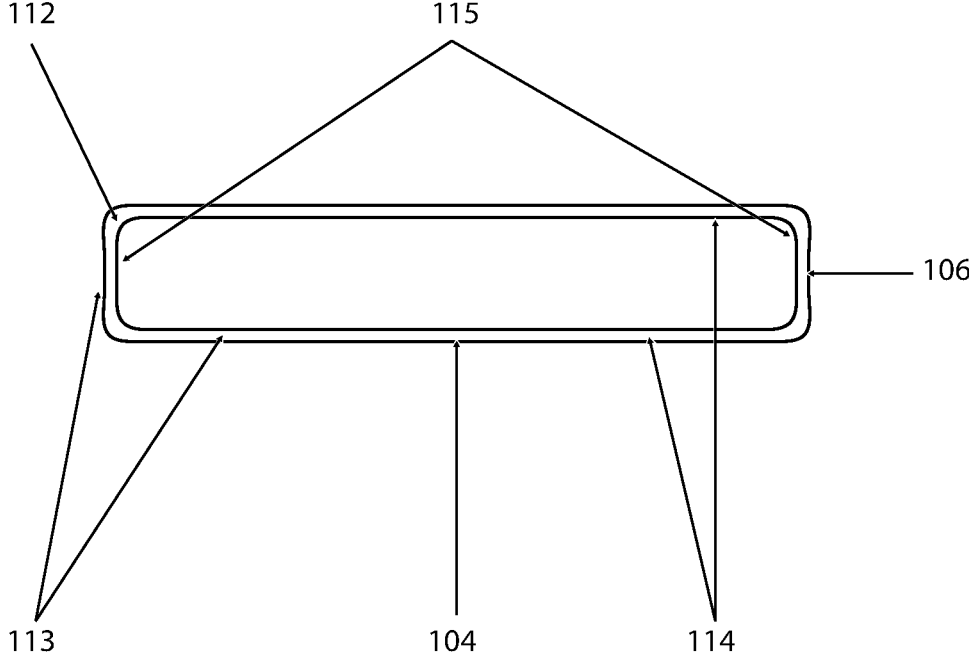
FIG. 5 illustrates an interior of the basin, in accordance with an embodiment of the present invention.

In accordance with an embodiment of the present invention, FIG. 5 illustrates an interior of the basin, or at least one side of the basin interior that is blown up showing the radius on the interior edge of the walls meeting. At the intersecting points of the walls of the basin 106, there are provided perpendicular walls 113 which are perpendicular to each other. Further, rounded edges or a radius 112 are incorporated where the basin walls are perpendicular to each other. Further, the basin wall comprises parallel walls 114, 115 as shown in the figure. This ingenious design choice prevents sharp corners that could otherwise trap insects or compromise the swatter's durability. Additionally, the side walls of the basin 106 are accompanied by internal walls that run parallel to them. These supplementary walls not only reinforce the structure but also maintain a perpendicular orientation to the bottom wall, ensuring the basin remains intact during use.

Some of the non-limiting advantages of the present invention are:

The design allows for efficient and hassle-free capture of insects, regardless of their size, thanks to the spacious basin and wide opening.

Rounded edges and reinforced walls at intersecting points increase the swatter's longevity, reducing the risk of damage during use.

The beveled tip facilitates easy scraping of insects into the basin, making it user-friendly and efficient.

The design minimizes the chances of insects getting stuck or trapped on the swatter, ensuring a cleaner and more hygienic pest control experience.

The use of resilient plastics like Polypropylene and Polyethylene, or similar materials, offers versatility and adaptability in manufacturing while maintaining durability.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

I claim:

1. An insect swatter comprising:
a flat top side utilized for striking insects;
a backside opposite the flat top side,
wherein the flat top side and backside form an integral part of the swatter, and the backside incorporates a basin situated on one side of a back wall of the swatter;
side walls extending substantially perpendicular from the back wall of the swatter, the side walls being substantially parallel to each other and connecting to a front wall of the basin, wherein the side walls are substantially perpendicular to the front wall;
a bottom wall that runs substantially perpendicular to both the front wall of the basin and the back wall of the swatter, as well as substantially perpendicular to side walls of the basin, with a side opposite the bottom wall within the basin left unbounded to create an opening;
wherein the entire swatter section is made of a one piece plastic; and
a handle, constructed from a flexible material and connected to the swatter body;
wherein both (i) a dimension of the bottom wall of the basin and (ii) a dimension of the opening of the basin exceed 3.2 mm (0.125 inches).

2. The insect swatter of claim 1, wherein the walls of the basin form intersecting points, which are substantially perpendicular to each other, wherein the intersecting points feature rounded edges or a radius at their junctions.

3. The insect swatter of claim 1, wherein the width of the bottom wall of the basin is narrower than the width of the opening of the basin.

4. The insect swatter of claim 1, wherein the side walls, the back side wall of the swatter, and the front wall of the basin combine to create a rectangular shape or a shape substantially resembling a rectangle.

5. The insect swatter of claim 1, wherein a top side portion of the swatter has a beveled tip, and the flat top side of the swatter body is marginally longer than the beveled tip of said swatter on the basin side.

6. The insect swatter of claim 1, wherein the thickness of the front wall of the basin does not exceed 2.0 mm (0.080 inches).

7. The insect swatter of claim 1, wherein the handle is integrated with the swatter body, resulting in a one-piece construction.

8. The insect swatter of claim 1, wherein the handle is incorporated into the swatter to enable the two components to operate seamlessly as a single integrated part.

9. An insect swatter comprising:
a flat top side utilized for striking insects;
a backside opposite the flat top side,
wherein the flat top side and backside form an integral part of the swatter, and the backside incorporates a basin situated on one side of a back wall of the swatter;
side walls extending substantially perpendicular from the backwall of the swatter, the side walls being substantially parallel to each other and connecting to a front wall of the basin, wherein the side walls are substantially perpendicular to the front wall;
a bottom wall that runs substantially perpendicular to both the front wall of the basin and the back wall of the swatter, as well as substantially perpendicular to side walls of the basin, with a side opposite the bottom wall within the basin left unbounded to create an opening;
wherein the entire swatter section is made of a one piece plastic; and
a handle, constructed from a flexible material and connected to the swatter body;
wherein the thickness of the front wall of the basin does not exceed 2.0 mm.

10. The insect swatter of claim 9, wherein the bottom wall of the basin and the opening of the basin both have a dimension exceeding 3.2 mm (⅛ inch).

\* \* \* \* \*